US012624726B2

(12) United States Patent
Regel

(10) Patent No.: US 12,624,726 B2
(45) Date of Patent: May 12, 2026

(54) BEARING HOLDING DEVICE AND ROLLING BEARING APPARATUS WITH A BEARING HOLDING DEVICE

(71) Applicant: Rolls-Royce Deutschland Ltd & Co KG, Blankenfelde-Mahlow (DE)

(72) Inventor: Tomasz Regel, Weisswasser (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 49 days.

(21) Appl. No.: 18/670,119

(22) Filed: May 21, 2024

(65) Prior Publication Data

US 2024/0401646 A1 Dec. 5, 2024

(30) Foreign Application Priority Data

Jun. 2, 2023 (DE) ..................... 10 2023 114 639.4

(51) Int. Cl.
| | |
|---|---|
| *F16C 27/04* | (2006.01) |
| *F01D 25/16* | (2006.01) |
| *F16C 19/06* | (2006.01) |
| *F16C 35/04* | (2006.01) |
| *F16C 35/077* | (2006.01) |
| *F16C 33/58* | (2006.01) |

(52) U.S. Cl.
CPC .......... *F16C 27/045* (2013.01); *F01D 25/164* (2013.01); *F16C 19/06* (2013.01); *F16C 35/045* (2013.01); *F16C 35/077* (2013.01); *F16C 33/581* (2013.01); *F16C 2326/43* (2013.01)

(58) Field of Classification Search
CPC ........ F16C 19/06; F16C 19/16; F16C 27/045; F16C 33/581; F16C 35/00; F16C 35/04; F16C 35/045; F16C 35/077; F16C 2326/43; F01D 25/164
See application file for complete search history.

(56) References Cited

U.S. PATENT DOCUMENTS

| | | | | |
|---|---|---|---|---|
| 5,803,612 A | * | 9/1998 | Battig ................... | F16C 19/542 |
| | | | | 384/99 |
| 2011/0188995 A1 | * | 8/2011 | Thomassin ............. | F16C 27/08 |
| | | | | 415/119 |
| 2015/0233293 A1 | * | 8/2015 | Grogg .................... | F16F 1/025 |
| | | | | 248/562 |

FOREIGN PATENT DOCUMENTS

| | | |
|---|---|---|
| CN | 218177742 U | 12/2022 |
| DE | 20005227 U1 | 8/2000 |

(Continued)

OTHER PUBLICATIONS

German Search Report dated Jan. 29, 2024 from counterpart German App No. 10 2023 114 639.4.

*Primary Examiner* — Alan B Waits

(74) *Attorney, Agent, or Firm* — SHUTTLEWORTH & INGERSOLL, PLC; Timothy J. Klima

(57) ABSTRACT

A bearing holding device with an annular inner region and a flange region, extending at least approximately outwards in the radial direction, with recesses, which flange region is designed in one piece with the inner region and is narrower in the axial direction than the annular inner region, is described. The flange region is, in the circumferential region, surrounded at least in certain regions by a connection region, which is formed in one piece with the flange region and via which the inner region and the flange region can be firmly connected to a housing. Furthermore, a rolling bearing apparatus with the bearing holding device is proposed.

13 Claims, 3 Drawing Sheets

(56)           References Cited

FOREIGN PATENT DOCUMENTS

Figure 1:
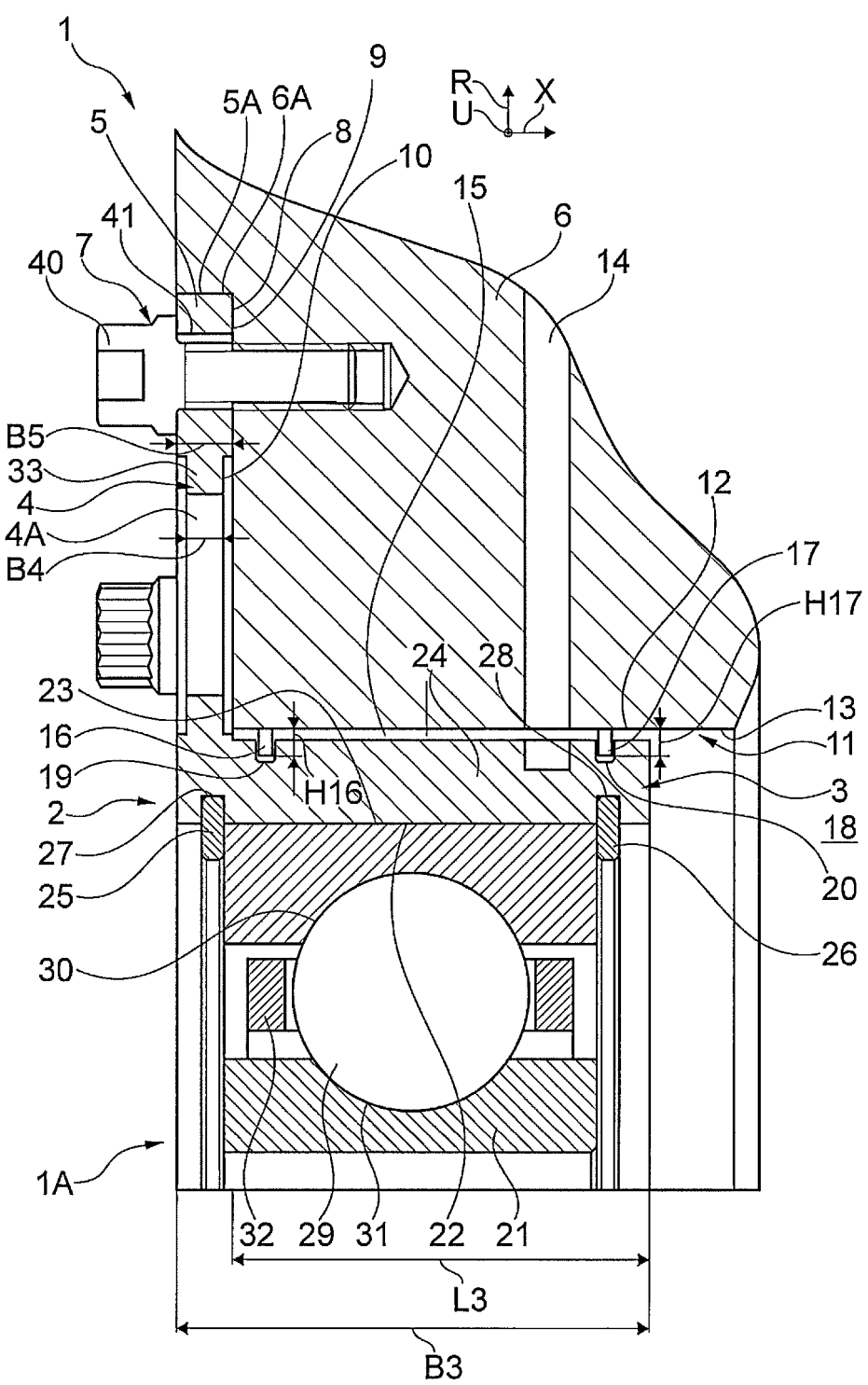

| | | | |
|---|---|---|---|
| DE | 102012216435 | A1 | 5/2014 |
| DE | 102012216437 | A1 | 5/2014 |
| DE | 102018107876 | A1 | 10/2019 |
| WO | 2014076191 | A1 | 5/2014 |

* cited by examiner

BEARING HOLDING DEVICE AND ROLLING BEARING APPARATUS WITH A BEARING HOLDING DEVICE

The present disclosure relates to a bearing holding device with an annular inner region and a rolling bearing apparatus with such a bearing holding device.

A bearing assembly for vehicles is known from CN 218177742U. The bearing assembly comprises a bearing inner ring, a bearing outer ring, balls arranged between the bearing inner ring and the bearing outer ring, a bearing cage accommodating the balls, a fixed outer ring, and a plurality of support rings arranged between the bearing outer ring and the fixed outer ring. The bearing cage is designed with a self-lubricating structure to minimize bearing wear.

However, the bearing assembly has a requirement for large installation space in the radial direction and the axial direction, which is often not available to the required extent.

The present disclosure is based upon the object of providing a bearing holding device that is structurally simple and favorable in terms of installation space, along with a rolling bearing apparatus that is favorable in terms of installation space and costs.

This object is achieved with a bearing holding device and with a rolling bearing apparatus with features as disclosed herein.

According to a first aspect, a bearing holding device with an annular inner region and a flange region, extending at least approximately in the radial direction to the outside, with recesses is proposed. The flange region is designed in one piece with the inner region and is narrower in the axial direction than the annular inner region. In addition, the flange region is surrounded at least in certain regions in the circumferential direction by a connection region, which is formed in one piece with the flange-like region and via which the inner region and the flange-like region can be firmly connected to a housing.

Based upon its one-piece design, the bearing holding device is characterized by a small number of parts and therefore requires little assembly effort and simplifies storage. In addition, the bearing holding device is also favorable for installation in both the axial direction and the radial direction, since the flange region is narrower in the axial direction than the annular inner region. In addition, based upon the design of the flange region with recesses in the radial direction, the bearing holding device provides spring properties that—particularly in combination with a so-called "squeeze oil damper"—offer the possibility of damping in the desired manner vibrations in the region of a component that is rotatably mounted via a rolling bearing apparatus designed with the bearing holding device.

If the flange region extends from the first axial end of the annular inner region and the connection region extends outwards from the flange region in the radial direction in each case, the bearing holding device can be fastened laterally in the axial direction to a housing, in which the annular inner region engages in the axial direction, with little effort via the connection region.

An axial width of the connection region and an axial width of the flange region can be matched to one another in such a way that the connection region bears flush against the housing with an axial side surface, which faces the second axial end of the annular inner region, and an axial end face, facing the housing, of the flange region is spaced apart from the housing in the axial direction. This ensures in a structurally simple way that deformations of the flange region in the radial direction can take place unhindered. In other words, resilient deflections between the annular inner region and the connection region are not influenced by frictional forces between the flange region and the housing, as a result of which undefined operating states in the region of a rolling bearing apparatus designed with the bearing holding device are avoided.

With a structurally simple embodiment of the bearing holding device that can be produced with little effort, the flange region has spring elements, formed to be annular at least in certain regions, which extend in the radial direction between the inner region and the connection region.

It is possible that the spring elements in each case encompass or define circular recesses of the flange region.

The flange region can have further recesses in the circumferential direction between the spring elements.

Depending upon the respective application, it is possible to arrange at least two of the spring elements to be spaced apart from one another in the circumferential direction or to connect them to one another in at least one region between the inner region and the connection region.

If the spring elements are connected to one another at least partially on the circumferential side, the spring stiffness of the flange region can be adjusted to be higher in a structurally simple manner compared to a design of the bearing holding device in which the spring elements are spaced apart from one another in the circumferential direction.

With an embodiment of the bearing holding device that is particularly favorable for installation space in the radial direction, the annular inner region is designed as a bearing outer shell of a rolling bearing. In addition, a radial inner side of the annular inner region can be formed with a running surface for rolling elements of the rolling bearing.

Alternatively, it is also possible that the annular inner region be formed to accommodate an outer bearing shell of a preferably standardized rolling bearing.

The radial inner side of the inner region can have at least one annular groove, in which a spring ring can be mounted for axial support of the outer bearing shell of a rolling bearing.

Two annular grooves spaced apart from one another in the axial direction can be formed in a radial outer side of the inner region. Sealing elements can be inserted into the annular grooves to seal an annular space between the outer side of the inner region, an inner side of a housing region in which the inner region engages in the axial direction, and the sealing elements.

According to a further aspect, a rolling bearing apparatus is proposed, which is formed with a bearing holding device described in more detail above.

An oil supply channel running in the housing region can open into the annular space between the outer side of the inner region and the inner side of the housing region, by which the inner region is encompassed on the circumferential side and in which the inner region engages in the axial direction at least in certain regions. In a state where the annular space is subjected to oil, the rolling bearing apparatus has a squeeze oil damper acting in the radial direction between the outer side of the annular inner region and the inner side of the housing region.

It is also possible that, between the inner side of the inner region, which is designed as an outer bearing shell, of the bearing holding device and an outer side of an inner bearing shell, rolling elements-preferably balls of a ball bearing or rollers of a rolling bearing—be arranged which roll on the inner side of the inner region of the bearing holding device and on the outer side of the inner bearing shell.

Alternatively, it is possible that the inner region be arranged in the radial direction between the housing region and an outer bearing shell of a rolling bearing.

With an easily mountable embodiment of the rolling bearing apparatus according to the present disclosure, the bearing holding device is screwed to the housing region in the connection region.

It is possible, for example, that bores or through-bores in the connection region, through which screws can be inserted, be arranged radially outside the spring elements and in the circumferential direction in each case in the center of the spring elements. As a result, a uniform load on the spring elements in the radial direction is achieved in a simple manner, which contributes to the fact that the connections between the spring elements and the inner region and also the connection between the spring elements and the connection region are in each case loaded to the lowest possible extent.

If, in contrast, the bores in the connection region are positioned in each case off-center to the spring elements in the circumferential direction, it is also possible to use deformation-related elasticities of the connection region to adjust the spring rate of the bearing holding device.

In principle, vibration-damped rolling bearings can be supported in the radial direction by the bearing holding device in conjunction with a so-called squeeze oil damper in such a way that radial deflection movements are possible in the region of a rolling bearing, and any vibrations that occur can be damped. It is possible to adjust the spring rate of the bearing holding device, depending upon the application, in particular by varying the cross-section of the spring elements.

In addition, the bearing holding device described above, which is a spring/web mechanism and can be used to create a bearing damping system with a defined stiffness, can in principle be used in any application in which damping is required between a bearing unit and a static support structure.

The invention is not limited to the specified combinations of the features of the independent claims or the claims dependent thereon. Furthermore, in the context of the claims, it is possible to combine individual features with one another, insofar as they are apparent from the claims, the following description of embodiments, or directly from the drawing. The reference of the claims to the drawings by the use of reference signs is not intended to limit the scope of protection of the claims.

Preferred further developments of the invention arise from the subclaims and the following description. Without being limited to this, exemplary embodiments of the invention are explained in more detail with reference to the drawing.

Figure 2:
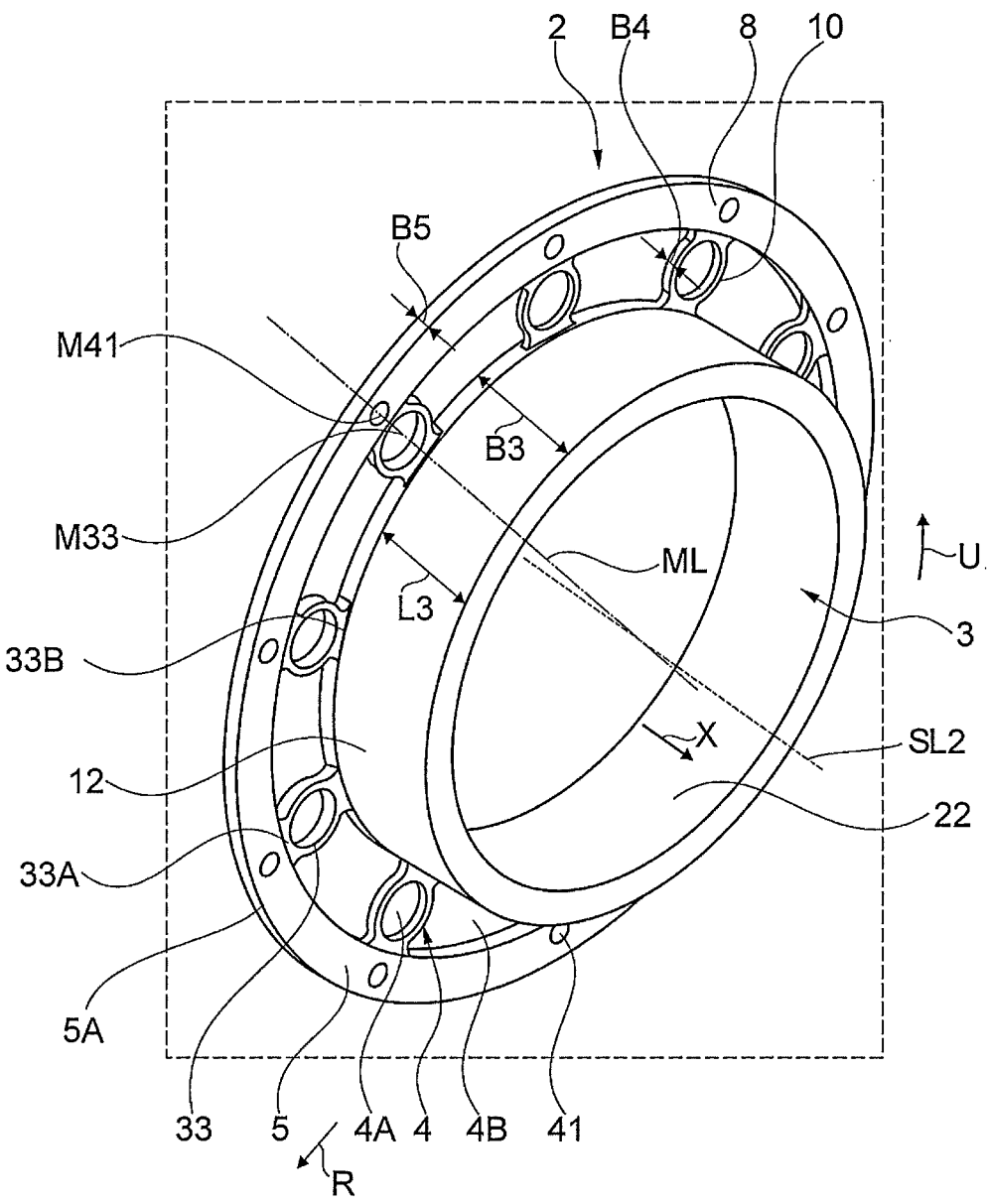
Figure 3:
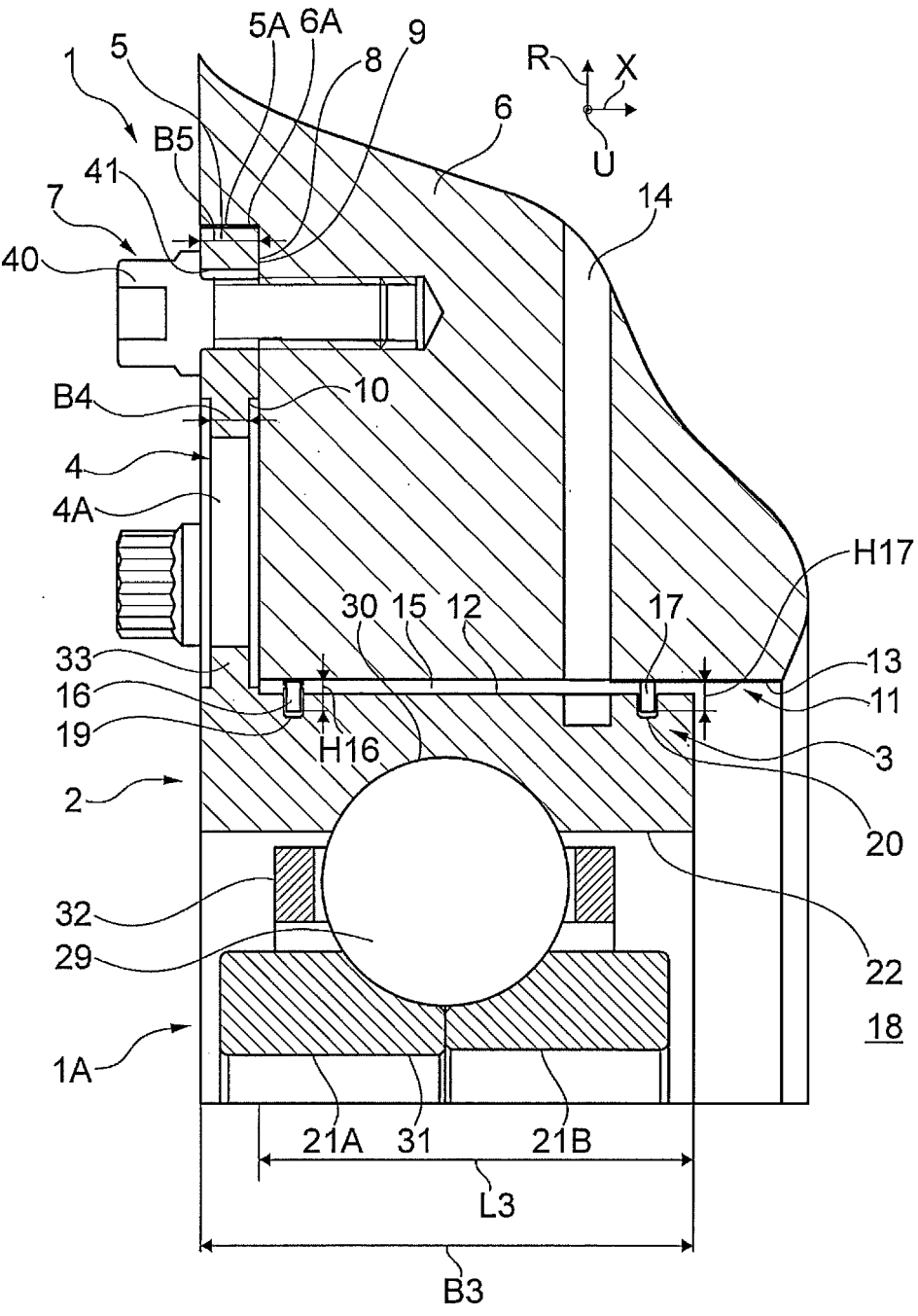

The following are shown:

FIG. 1 a partial longitudinal sectional view of a first embodiment of a rolling bearing apparatus with a bearing holding device;

FIG. 2 a three-dimensional individual view of the bearing holding device according to FIG. 1; and FIG. 3 a representation, corresponding to FIG. 1, of a further embodiment of the rolling bearing apparatus.

FIG. 1 shows a partial longitudinal sectional view of a first embodiment of a rolling bearing apparatus 1 with a rolling bearing 1A and with a bearing holding device 2. The bearing holding device 2 has an annular inner region 3 and a flange region 4 extending outwards in the radial direction R from the inner region 3. The flange region 4 comprises recesses 4A and is designed in one piece with the inner region 3. In addition, the flange region 4 is surrounded by a connection region 5 in the radial direction R and in the circumferential direction U. The inner region 3, the flange region 4, and the connection region 5 are designed in one piece, wherein the inner region 3 and the flange region 4 are firmly connected to a housing 6 via the connection region 5 using screw connections 7. Screws 40 of the screw connections 7 pass through the connection region 5 in each case in the region of through-bores 41.

An axial width B5 of the connection region 5 is greater than an axial width B4 of the flange region 4. In addition, an axial width B3 of the annular inner region 3 is greater than the axial width B5 of the connection region 5. In the mounted state of the rolling bearing apparatus 1, the bearing holding device 2 bears with an axial side surface 8 of the connection region 5 against a side surface 9 of the housing 6. In contrast, an axial side surface 10 of the flange region 4 is spaced apart in the axial direction X from the side surface 9 of the housing 6.

The annular inner region 3 engages in the axial direction X over an axial length L3 in a bore 11 of the housing 6 and interacts there with an outer side 12 with an inner side 13 of the bore 11 of the housing 6 in the manner described in more detail below. In addition, a radial outer side 5A of the connection region 5 of the bearing holding device 2 bears against a radial inner side 6A of a shoulder 6B of the housing 6 and is supported there in the radial direction R outwards in the housing 6. In other words, in this radial contact region of the bearing holding device 2 on the housing 6 in the region of the rolling bearing 1A, radial bearing forces occurring during operation, which at least partially also bear against or act upon the bearing holding device 2, are supported in the housing 6. As a result, shear stresses acting in the radial direction R in the region of the screw connections 7 are limited or avoided with little design effort.

In the present case, an oil supply channel 14, through which oil can be fed into an annular space 15, runs in the housing 6 or in the housing region shown in FIG. 1. The annular space 15 is delimited in the radial direction R by the inner side 13 of the housing 6 and by the outer side 12 of the annular inner region 3 and is sealed in the axial direction X by two sealing elements 16, 17 with respect to a surrounding area 18 of the rolling bearing apparatus 1. The two sealing elements 16 and 17 are arranged in annular grooves 19, 20, which are machined into the outer side 12 of the annular inner region 3. The sealing elements 16 and 17 are installed in a spring-loaded state in the radial direction R at such a height H16, H17 that they are partially arranged radially on the inside spaced apart from the groove bases of the annular grooves 19 and 20 and bear radially on the outside against the inner side 13 of the housing 6 in a sealing manner.

If the annular space 15 is subjected to oil, the oil volume present in the annular space 15 acts as a squeeze oil damper during operation of the rolling bearing apparatus 1 and dampens vibrations, which occur in the region of the rolling bearing apparatus 1 during the rotation of a component that can rotate radially within an inner bearing ring 21, e.g., a shaft of an aircraft engine, in the region of the rolling bearing apparatus 1.

The rolling bearing 1A is arranged in the radial direction R within the annular inner region 3, wherein a radial inner side 22 of the annular inner region 3 interacts with an outer side 23 of an outer bearing shell 24 of the rolling bearing 1A. In the present case, the outer bearing shell 24 is held in the axial direction X by two spring rings 25, 26 so that it cannot be displaced relative to the annular inner region 3. For this purpose, the spring rings 25 and 26 are inserted into annular grooves 27, 28, which are provided in the inner side 22 of the inner region 3.

With the exemplary embodiment shown in FIG. 1, the rolling bearing apparatus 1 comprises rolling elements 29 formed as balls, which roll on a running surface 30 of the outer bearing shell 24 and a running surface 31 of the inner bearing shell 21. In addition, the rolling elements 29 are guided and held in a bearing cage 32 both in the circumferential direction U and in the axial direction X in a manner known per se.

FIG. 2 shows the bearing holding device 2 according to FIG. 1 in a three-dimensional, single representation. The representation according to FIG. 2 shows that the flange region 4 comprises a plurality of spring elements 33 arranged equidistantly to one another in the circumferential direction U and spaced apart from one another. The spring elements 33 are in each case firmly connected radially on the inside to the annular inner region 3 and radially on the outside to the connection region 5.

In addition, the spring elements 33 are formed to be circular and surround or delimit the circular recesses 4A. In addition, the flange region 4 has further recesses 4B in each case between the spring elements 33 in the circumferential direction U, so that the bearing holding device 2 is designed with a defined spring stiffness of the flange region 4 in the radial direction R.

In the present case, center points M41 of the through-bores 41 and center points M33 of the spring elements 33 lie on a common line ML, which is perpendicular to a line of symmetry SL2 of the bearing holding device 2. As a result, it is ensured that deformations of the spring elements 33, which occur due to relative movements of the annular inner region with respect to the housing 6, are resiliently supported as evenly as possible in the flange region 4, and that the spring elements 33 are deformed as symmetrically as possible during deflection. As a result, attachment regions 33A, via which the spring elements 33 are in each case connected to the connection region 5, and attachment regions 33B, via which the spring elements 33 are in each case connected to the annular inner region 3, are in each case loaded to the smallest possible extent by shear forces acting in the circumferential direction U. Thus, the bearing holding device 2 can be operated over the longest possible service life with minimal design effort.

If, on the other hand, the center points of the through-bores and the center points of the spring elements are arranged offset to one another in the circumferential direction U, the elasticity of the connection region 5 contributes a greater amount to the spring stiffness of the bearing holding device 2 than is the case when the center points M41 and M33 of the through-bores 41 and the spring elements 33 are aligned in the radial direction R.

FIG. 3 shows a representation, corresponding to FIG. 1, of a further embodiment of the rolling bearing apparatus 1, which substantially only differs from the rolling bearing apparatus 1 according to FIG. 1 in that the outer bearing shell 24 is designed integrally with the annular inner region 3, and the running surface 30 is designed in the inner side 22 of the annular inner region 3. As a result, the rolling bearing apparatus 1 according to FIG. 3 has a lower requirement for installation space in the radial direction R than the design of the rolling bearing apparatus 1 according to FIG. 1. In addition, the inner bearing ring 21 of the rolling bearing apparatus 1 according to FIG. 3 is designed to be split and comprises the two inner bearing sub-rings 21A, 21B, whereas the inner bearing ring 21 of the rolling bearing apparatus 1 according to FIG. 1 is formed in one piece.

With regard to the further structural design and the basic mode of operation of the rolling bearing apparatus 1 according to FIG. 3, reference is made to the above description of FIG. 1 and FIG. 2.

LIST OF REFERENCE SIGNS

1 Rolling bearing apparatus
1A Rolling bearing
2 Bearing holding device
3 Annular inner region
4 Flange region
4A Recess of the flange region
4B Further recess of the flange region
5 Connection region
5A Radial outer side of the connection region
6 Housing
6A Radial inner side of the shoulder 6B
6B Shoulder of the housing 6
7 Screw connections
8 Axial side surface of the connection region
9 Side surface of the housing
10 Axial side surface of the flange region
11 Bore of the housing
12 Radial outer side of the annular inner region
13 Radial inner side of the housing 6 or the bore 11
14 Oil supply channel
15 Annular space
16, 17 Sealing element
18 Surrounding area
19, 20 Annular groove in the radial outer side of the annular inner region
21 Inner bearing ring
21A, 21B Inner bearing sub-ring
22 Radial inner side of the annular inner region 3
23 Radial outer side of the outer bearing shell 24
24 Outer bearing shell
25, 26 Spring ring
27, 28 Annular groove in the radial inner side 22 of the annular inner region
29 Rolling element, ball
30 Running surface of the outer bearing shell 24
31 Running surface of the inner bearing shell 21
32 Bearing cage
33 Spring element
33A Attachment region of the spring element 33 to the connection region 5
33B Attachment region of the spring element 33 to the annular inner region 3
40 Screws
41 Through-bore
B3 Axial width of the annular inner region
B4 Axial width of the flange region
B5 Axial width of the connection region
H16 Radial height of the sealing element 16
H17 Radial height of the sealing element 17
L3 Axial length
M33 Center point of the spring element
M41 Center point of the through-bore
ML Line
SL2 Line of symmetry of the bearing holding device
R Radial direction
U Circumferential direction
X Axial direction

The invention claimed is:

1. A bearing holding device comprising:

an annular inner region and a flange region, extending outwardly in a radial direction, with recesses, the flange region being configured in one piece with the annular inner region and being narrower in an axial direction than the annular inner region, wherein the flange region is, in a circumferential direction, surrounded at least in certain regions by a connection region, which is formed in one piece with the flange region and via which the annular inner region and the flange region are connectable to a housing, wherein the flange region includes a plurality of spring elements spaced apart from one another on the circumferential direction, with each of the spring elements having a closed circular cross-section surrounding an open recess, the spring elements extending in a radial direction between the annular inner region and the connection region, each of the spring elements being connected at an inner radial portion to the annular inner region and at an outer radial portion to the connection region, wherein the flange region includes further recesses in the circumferential direction between at least some of the spring elements.

2. The bearing holding device according to claim 1, wherein the flange region extends from an axial end of the annular inner region and the connection region extends outwards from the flange region in the radial direction.

3. The bearing holding device according to claim 1, wherein an axially inner side surface of the flange region is recessed axially outwardly from an axially inner side surface of the connection region to provide a clearance gap between the axially inner side surface of the flange region and a plane defined by the axially inner side surface of the connection region such that the flange region is axially spaced apart from the housing when the bearing holding device is attached to the housing.

4. The bearing holding device according to claim 1, wherein at least two of the spring elements are connected to one another in at least one region between the annular inner region and the connection region.

5. The bearing holding device according to claim 1, wherein the annular inner region is configured as an outer bearing shell of a rolling bearing, wherein a radial inner side of the annular inner region is formed with a running surface for rolling elements of the rolling bearing.

6. The bearing holding device according to claim 1, wherein the annular inner region is formed to accommodate an outer bearing shell of a rolling bearing.

7. The bearing holding device according to claim 6, wherein the radial inner side of the annular inner region has at least one annular groove configured to house a spring ring for axial support of the outer bearing shell of the rolling bearing.

8. The bearing holding device according to claim 1, wherein, in a radial outer side of the annular inner region, two annular grooves spaced apart from one another in the axial direction are formed, into which sealing elements are insertable for sealing an annular space between the outer side of the annular inner region, an inner side of the housing, and the sealing elements.

9. A rolling bearing apparatus, which is formed with the bearing holding device according to claim 1.

10. The rolling bearing apparatus according to claim 9, wherein, in an annular space between the outer side of the annular inner region and the inner side of the housing, by which the annular inner region is encompassed on the circumferential side and in which the annular inner region engages in axial direction at least in certain regions, an oil supply channel running in the housing opens, wherein, in a state where the annular space is subjected to oil, the rolling bearing apparatus has a squeeze oil damper acting in the radial direction between the outer side of the annular inner region and the inner side of the housing.

11. The rolling bearing apparatus according to claim 9, and further comprising rolling elements arranged between the inner side of the annular inner region, configured as an outer bearing shell, of the bearing holding device and an outer side of an inner bearing shell, the rolling elements configured to roll on the inner side of the annular inner region of the bearing holding device and on the outer side of the inner bearing shell.

12. The rolling bearing apparatus according to claim 9, wherein the annular inner region is arranged in the radial direction between the housing and an outer bearing shell of a rolling bearing.

13. The rolling bearing apparatus according to claim 9, wherein the bearing holding device is threaded to the housing in the connection region.

* * * * *